US012801389B2

(12) United States Patent
Sun et al.

(10) Patent No.: US 12,801,389 B2
(45) Date of Patent: Nov. 17, 2026

(54) APPARATUS, DEVICE, METHOD, AND COMPUTER PROGRAM FOR EXTENDING INSTRUCTIONS SUPPORTED BY A PROCESSOR

(71) Applicant: Intel Corporation, Santa Clara, CA (US)

(72) Inventors: Mingqiu Sun, Beaverton, OR (US); Vincent Zimmer, Issaquah, WA (US); Rajesh Poornachandran, Portland, OR (US); Gopinatth Selvaraje, Portland, OR (US)

(73) Assignee: Intel Products IP LLC, Santa Clara, CA (US)

( * ) Notice: Subject to any disclaimer, the term of this patent is extended or adjusted under 35 U.S.C. 154(b) by 57 days.

(21) Appl. No.: 17/934,580

(22) Filed: Sep. 23, 2022

(65) Prior Publication Data

US 2024/0143329 A1 May 2, 2024
US 2024/0281252 A2 Aug. 22, 2024

(51) Int. Cl.

*G06F 9/30* (2018.01)
*G06F 9/455* (2018.01)
*G06F 21/57* (2013.01)

(52) U.S. Cl.

CPC ...... *G06F 9/30181* (2013.01); *G06F 9/45508* (2013.01); *G06F 21/57* (2013.01)

(58) Field of Classification Search

CPC ............. G06F 9/30145; G06F 9/45508; G06F 9/30181; G06F 21/57
USPC .......................................................... 712/226
See application file for complete search history.

(56) References Cited

U.S. PATENT DOCUMENTS

| | | | | |
|---|---|---|---|---|
| 2011/0296431 A1* | 12/2011 | Gschwind | G06F 9/544 | 719/310 |
| 2013/0290692 A1* | 10/2013 | Guerrero | G06F 15/7867 | 713/1 |
| 2017/0046163 A1* | 2/2017 | Frazier | G06F 9/30181 | |
| 2022/0206815 A1* | 6/2022 | Wang | G06F 9/3004 | |

OTHER PUBLICATIONS

Article—Intel advances Architecture for Data Center, HPC-AI and Client Computing https://www.intel.com/content/www/US/en/newsroom/opinion/intel-advances-architecture-data-center-hpc-ai-client-computing.html Aug. 19, 2021.
Presentation "GOD MODE unlocked: Hardware backdoors in x86 CPUs" domas / @xoreaxeaxeax at Black Hat 2018.

* cited by examiner

*Primary Examiner* — Chun Kuan Lee
(74) *Attorney, Agent, or Firm* — 2SPL Patent Attorneys PartG mbB; Yong Beom Hwang

(57) ABSTRACT

Various examples relate to an apparatus, device, method, and computer program for extending instructions sup-ported by a processor. The apparatus is configured to identify at least a part of a computer program targeting an instruction unsupported by a pre-defined set of instructions of an Instruction Set Architecture (ISA) of the processor. The apparatus is configured to extend the instructions supported by the processor, based on the targeted unsupported instruction. The apparatus is configured to execute the computer program.

24 Claims, 2 Drawing Sheets

APPARATUS, DEVICE, METHOD, AND COMPUTER PROGRAM FOR EXTENDING INSTRUCTIONS SUPPORTED BY A PROCESSOR

BACKGROUND

WebAssembly defines a bytecode (i.e., compiled code that is compiled to an intermediate representation instead of machine code) that is primarily used for executing web applications on client devices. In many cases, such synthetic intermediate representations are often biased towards specific ISA (Instruction Set Architecture) such as the ARM ISA. As result, in many cases, there is a 1:1 mapping between an operation of the intermediate representation and an operation of the ARM ISA, whereas there is a 1:N mapping between the operation of the intermediate representation and operations of a x86 ISA. Runtimes for such bytecode often statically generate code for one or more native architecture macroinstruction (e.g. AVX2 Add) to a microoperation (fp_double_add). This may result in poor portability, requiring software support to perform the mapping. Moreover, the generated JITed (Just-In-Time-compiled) code may be less efficient, thereby resulting in a reduced performance per watt and higher costs.

Jazelle is an extension for ARM-based processors that allows the direct execution of Java bytecode. However, directly supporting intermediate representations or synthetic ISAs is costly from a validation and ecosystem deployment. Therefore, such extensions are rarely used. Some processors, such as VIA Centaur, support exposure of a micro-ISA as a mode. Moreover, some processors, such as AMD K6, are based on a Reduced Instruction Set Computing (RISC) architecture denoted RISC86, which translates Complex Instruction Set Computing (CISC) instructions into RISC microoperations.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
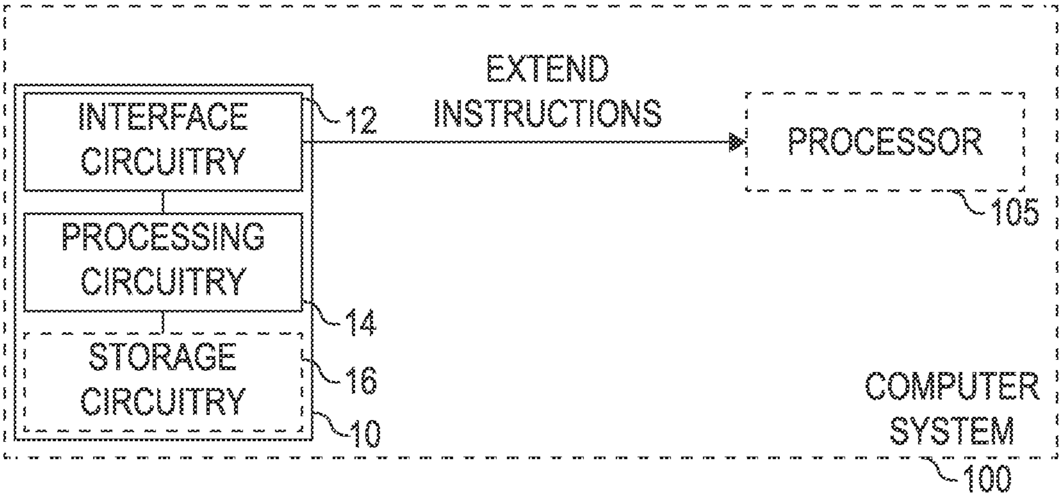
FIG. 1*a* shows a block diagram of an example of an apparatus or device for extending instructions supported by a processor, and of a computer system comprising such an apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

FIG. 1*a* shows a block diagram of an example of an apparatus 10 or device 10 for extending instructions supported by a processor 105. The apparatus 10 comprises circuitry that is configured to provide the functionality of the apparatus 10. For example, the apparatus 10 of FIGS. 1*a* and 1*b* comprises interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information, e.g., with other components inside or outside a computer system 100 comprising the apparatus or device 10, such as the processor 105 or a server of a manufacturer of the processor 105) and the storage circuitry (for storing information, such as machine-readable instructions) 16. Likewise, the device 10 may comprise means that is/are configured to provide the functionality of the device 10. The components of the device 10 are defined as component means, which may correspond to, or implemented by, the respective structural components of the apparatus 10. For example, the device 10 of FIGS. 1*a* and 1*b* comprises means for processing 14, which may correspond to or be implemented by the processing circuitry 14, means for communicating 12, which may correspond to or be implemented by the interface circuitry 12, and (optional) means for storing information 16, which may correspond to or be implemented by the storage circuitry 16. In general, the functionality of the processing circuitry 14 or means for processing 14 may be implemented by the processing circuitry 14 or means for processing 14 executing machine-readable instructions. Accordingly, any feature ascribed to the processing circuitry 14 or means for processing 14 may be defined by one or more instructions of a plurality of machine-readable instructions. The apparatus 10 or device 10 may comprise the machine-readable instructions, e.g., within the storage circuitry 16 or means for storing information 16.

The processing circuitry 14 or means for processing 14 is configured to identify at least a part of a computer program targeting an instruction unsupported by a pre-defined set of instructions of an Instruction Set Architecture (ISA) of the processor 105. The processing circuitry 14 or means for processing is configured to extend the instructions supported by the processor, based on the targeted unsupported instruction. The processing circuitry 14 or means for processing is configured to execute the computer program.

FIG. 1*a* further shows a computer system 100 comprising the apparatus 10 or device 10 and the processor 105. In many examples illustrated in the following, the processor 105 may be assumed to be a Central Processing Unit (CPU) of the computer system. In other words, the processor may be a Central Processing Unit (CPU). However, the concept may also be applied to non-CPU processors. In more general germs, the concept may be applied to XPUs (i.e., any type of computing device, such as a CPU, Graphics Processing Unit (GPU), an Artificial Intelligence (AI) accelerator, an accelerator card and offloading circuitry). In other words, the processor may be an XPU, such as one of a CPU, a GPU, an AI accelerator, an accelerator card, and offloading circuitry. In particular, the processor 105 may be a non-CPU XPU, e.g., an XPU that is used in addition to the CPU of the computer system. Accordingly, the computer system 100 may comprise a CPU (which may be the processing circuitry 14 or means for processing 14 of the apparatus 10 or device 10) and a non-CPU XPU, which may be the processor 105.

Figure 1B:
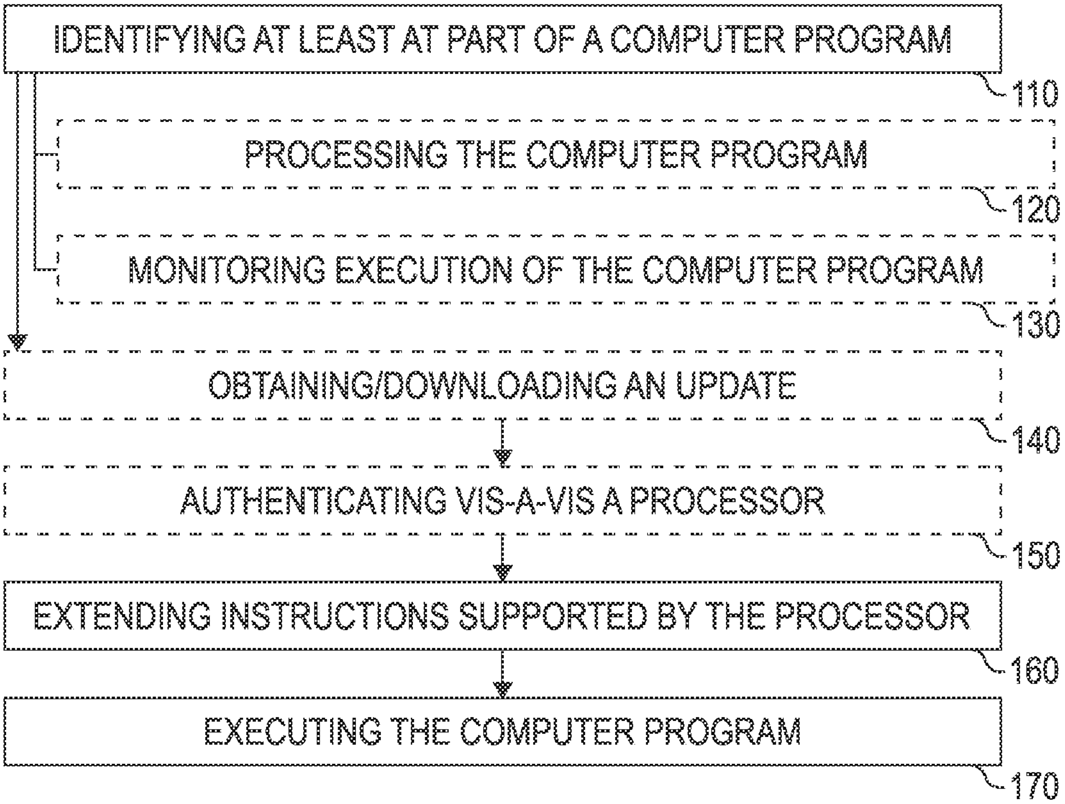
FIG. 1*b* shows a flow chart of an example of a method for extending instructions supported by a processor.

FIG. 1*b* shows a flow chart of an example of a corresponding method for extending instructions supported by a processor. The method comprises identifying 110 the at least part of the computer program targeting the instruction unsupported by a pre-defined set of instructions of an Instruction Set Architecture ISA of the processor. The method comprises extending 160 the instructions supported by the processor, based on the targeted unsupported instruction. The method comprises executing 170 the computer program. For example, the method may be performed by the computer system 100, e.g., by the apparatus 10 or device 10 of the computer system. The method may be embodied by a computer program, for example.

In the following, the functionality of the apparatus 10, the device 10, the method and of a corresponding computer program is illustrated with respect to the apparatus 10. Features introduced in connection with the apparatus 10 may likewise be included in the corresponding device 10, method and computer program.

Various examples of the present disclosure are based on the finding, that some types of computer programs do not target the ISA of the processor they are executed on. This may be, for example, the case when bytecode or code in an intermediate representation, such as WebAssembly bytecode (WASM) or Java bytecode, is executed on an arbitrary processor. In other words, the computer program may be based on a bytecode or an intermediate representation (IR). While executing such bytecode on arbitrary processors is possible, as the bytecode is then compiled (again) as native code, in many cases, there is a non-ideal fit between the operation codes (short "opcodes") or instructions used in the bytecode/intermediate representation and the opcodes/instructions supported by the target processor, resulting in a loss of efficiency for some processors. For example, various aspects of WebAssembly may be targeted towards RISC (Reduced Instruction Set Computer)-based ISAs, such as the ARM ISA, so there is a good fit between opcodes/instructions of the WebAssembly bytecode and the opcodes/instructions supported by the respective RISC-based ISA. This may be in contrast to the fit between the opcodes/instructions of the WebAssembly bytecode and the opcodes/instructions supported by CISC (Complex Instruction Set Computer)-based ISAs such as the x86 ISA. In this case, some opcodes/instructions of the WebAssembly bytecode may be mapped to multiple opcodes/instructions of the x86-based ISA, resulting in a loss of efficiency.

Another scenario where the computer programs comprises instructions that target an instruction unsupported by the pre-defined set of instructions of the ISA of the processor relates to emulators, i.e., emulators for emulating a different ISA. In this case, the computer program being emulated may comprise (or be composed) of instructions that target the different ISA, and that are, in many cases, not directly supported by the ISA of the processor. For example, such emulators may be used for emulating a RISC-based ISA (e.g., the ARM or RISC-V ISA) on a CISC-based processor (e.g., an x86 processor) or vice versa. Accordingly, the computer program targeting an instruction unsupported by the set of instructions may be an emulator for emulating a second ISA being different from the ISA of the processor.

Accordingly, in both cases, the ISA of the processor may be a CISC-based ISA (e.g., an x86-based ISA) or a RISC-based ISA (e.g., an ARM-based ISA or a RISC-V-based ISA). The instruction unsupported by the set of instructions may be a RISC-based instruction, e.g., a RISC-V based instruction or ARM-based instruction, or the instruction unsupported by the set of instructions may be a CISC-based instruction (e.g., an x86-based instruction).

The present disclosure relates to a concept for handling such instructions that are unsupported by the ISA of the processor. In accordance with the examples given above, the processing circuitry may be configured to execute a runtime (for executing bytecode or an intermediate representation) or emulator (for emulating a different ISA), with the runtime or emulator performing the identification of the at least part of the computer program, the extending of the instructions supported by the processor and the execution of the computer program. Accordingly, the method may be performed by the runtime or emulator, respectively.

The proposed concept takes a dynamic approach, i.e., the instructions supported by the processor are extended as needed by the computer program being executed. Accordingly, the process may start with identifying the instruction that is unsupported by the ISA of the processor. In other words, the processing circuitry 14 is configured to identify the at least a part of a computer program targeting an instruction unsupported by the pre-defined set of instructions of the ISA of the processor. In other words, the proposed concept may be applied in case when a part of a computer program targets an instruction that is unsupported by the set of instructions of the ISA of the processor. In general, this pre-defined set of instruction of the ISA may be macroinstructions defined by the ISA of the processor. Macroinstructions are instructions that are publicly exposed via the ISA, and map to corresponding microinstructions/microoperations of the processor when the respective macroinstruction is called. For example, the pre-defined set of instructions may be obtained via the "CPUID" instruction (i.e., the CPUID opcode) from the processor. In x86 processors, in the response to the CPUID instruction, the instructions supported by the processor (that extend the base x86 ISA) may be obtained via the so-called feature bits, which may differ between CPU manufacturers. If the processor is a different type of processor, e.g., a non-CPU XPU, a corresponding command may be used, or the information may be taken from a spec sheet of the respective XPU. For example, the processing circuitry may be configured to identify one or more instructions or opcodes used in the computer program that are unsupported by the pre-defined set of instructions of the ISA of the processor.

In various examples, the instruction unsupported by the set of instructions may be an instruction of a second ISA being different from the ISA of the processor. This second ISA may be an ISA of a different processor or processor architecture. For example, if the processor is a CISC-based processor (e.g., an x86-based processor) with a CISC-based ISA, the second ISA may be a RISC-based ISA. However, the same principle may be used with synthetic ISAs, i.e., ISAs targeted/used by a bytecode or intermediate representation contained in the computer program. In this case, the second ISA may be the synthetic ISA of the bytecode or intermediate representation.

In the following, two approaches for identifying the portion of the computer program targeting the instruction unsupported by the pre-defined set of instructions (e.g., the macroinstructions) of the ISA of the processor are presented. However, the proposed concept is not limited to these examples—there are other approaches, such as the use of heuristics, that may be used instead. In a first approach, the processing circuitry may be configured to process the computer program, e.g., using static or dynamic analysis, to identify the at least part of the computer program targeting an instruction unsupported by the set of instructions. Accordingly, as further shown in FIG. 1*b*, the method may optionally comprise processing 120 the computer program to identify 110 the at least part of the computer program targeting an instruction unsupported by the set of instructions. For example, the processing circuitry may be configured to process the instructions used by the computer program to identify the unsupported instructions, e.g., using a regular expressions-based pattern-recognition algorithm on the instructions contained in the computer program, or by traversing a control graph of the computer program and checking the instructions that are part of the control graph.

In a second approach, the computer program may be executed (without extending the instructions supported by the processor prior to execution), and the execution may be monitored. For example, the processing circuitry may be configured to monitor the execution of the program to identify at least a part of the computer program targeting an instruction unsupported by the set of instructions. Accordingly, as further shown in FIG. 1*b*, the method may optionally comprise monitoring 130 the execution of the program to identify at least a part of the computer program targeting an instruction unsupported by the set of instructions. For example, a prior execution of the computer program may be monitored, with the monitoring having occurred prior to the identification of the part of the computer program targeting the unsupported instruction.

Once the respective instruction or instructions that are unsupported by the computer program have been identified, the capabilities, and in particular instructions supported by the processor, may be extended. In other words, the processing circuitry is configured to extend the instructions supported by the processor, based on the targeted unsupported instruction.

In modern CPUs, and in particular x86-based processors by Intel®, for example, there are two types of operations/instructions that are supported by the processor—macroinstructions/macro-operations, which are outward-facing instructions that represent the ISA of the processor, and microinstructions/micro-operations, which are instructions that are supported internally by the CPU. In general, a control unit of the processor/CPU is used to translate the macroinstructions/macro-operations to the corresponding microinstructions/microoperations. For example, in CPUs, the control unit of the CPU is generally responsible for translating machine-code instructions (which usually are macroinstructions) defined by a computer program to circuit-level micro-operations (uOps). However, in case this translation proves, after shipping, to produce errors, some of the machine-code instructions can be handled via microcode, instead of being handled by the hard-coded (and therefore more efficient control unit). The respective instructions can be "trapped" and be executed via the microcode instead. The functionality of the microcode-based translation is the same—the machine-code instructions are translated into corresponding micro-operations. However, the microcode can be updated after the respective processing device has been shipped, at runtime.

In the proposed concept, this mechanism may be used to extend the instructions supported by the processor, to improve the efficiency of executing instructions that were unsupported (i.e., supported without requiring a workaround or emulation) by the ISA of the processor. In effect, extending the instructions supported by the processor may comprise applying an update with support for the targeted unsupported instruction at the processor. In particular, extending the instructions supported by the processor may comprise applying a microcode update with support for the targeted unsupported instruction at the processor. For example, the update may apply additional microcode (to be executed by the processor) to the processor. In other words, the microcode being used by the processor may be extended by the update. This microcode update may extend the instructions supported by the processor, i.e., add at least one instruction that was previously unsupported. For example, extending the instructions supported by the processor adds at least one microinstruction or macroinstruction to the instructions supported by the processor. While the mechanism may be used for both macroinstructions and microinstructions, in the present context, support of the instruction may be kept hidden from public, so that the newly added instruction can only be used by computer programs that are aware of the instruction being present, e.g., the aforementioned emulator. For example, the added at least one microinstruction or macroinstruction may be not publicly exposed (e.g., in response to the CPUID instruction) as part of the instructions supported by the processor. For example, the added at least one instruction may be at least one microinstruction, which may be called by the runtime, emulator, or computer program, but which may be hidden otherwise. When such an instruction is called, the instruction may be trapped and processed by the microcode added via the update. For example, in the context of FIG. 2, this at least one microinstruction is shown as part of a pool of microinstructions (fine_grain_uop).

Figure 2:
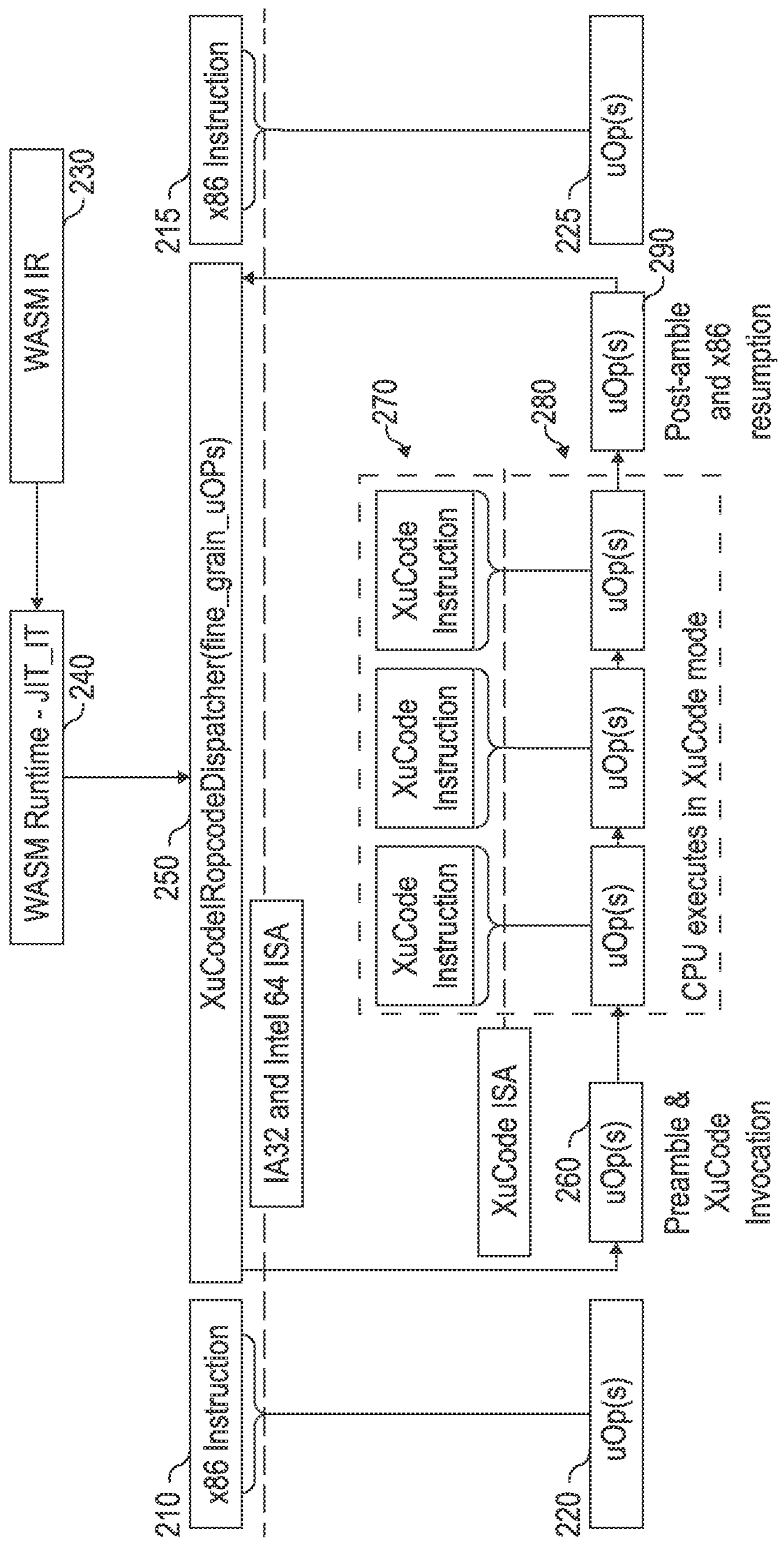
FIG. 2 shows a schematic illustration of ISA emulation by replacing marker stubs with native microoperations.

In general, the instructions supported by the processor may be extended by defining the at least one instruction in a microcode update, with the microcode update comprising a mapping between a newly defined opcode of the instruction and a corresponding functionality (e.g., use of registers, arithmetic logic units, memory execution unit etc.) of the processor. In some examples, the microcode update may comprise a straight-forward mapping between the newly defined opcode and the respective functionality of the processor. If such a direct mapping cannot be defined (due to lack of underlying capabilities of the processor), the instructions may be extended using an extended microcode technique, such as Intel® XuCode (as illustrated in connection with FIG. 2), or by mapping the newly defined opcode to a functionality provided by a programmable hardware component, such as an on-die XPU (e.g., a FieldProgrammable Gate Array (FPGA)) of the processor 105. As shown in FIG. 2, when using an extended microcode technique, such as XuCode, the microcode update may comprise extended microcode instructions (e.g., XuCode instructions), which may map the newly defined opcode to one or more micro-operations supported by the processor. When using a programmable hardware component, the update may further comprise an update of the programmable hardware component, to enable support of the programmable hardware component for handling the instruction.

While the concept of altering the instructions supported by a processor is known, as microcode updates have been used for years, in the present context, this alteration of the instruction set is performed dynamically, to support execution of a specific computer program. For example, extending the instructions supported by the processor may be performed at runtime in preparation of the execution of the computer program. In other words, the instructions supported by the processor may be extended based on the (specific) computer program that is to be executed. Accordingly, the instructions supported by the processor might only be extended if the extension is necessary for, or beneficial to, the execution of the computer program. For example, extending the instructions supported by the processor may be performed if execution of part of the computer program targeting an instruction unsupported by the set of instructions requires emulation or replacement of the instruction by two or more corresponding instructions of the set of instructions. More generally, extending the instructions supported by the processor may be performed if the instructions supported by the processor do not allow for an optimized execution of the computer program. This may be the case if the unsupported instruction would lead to emulation or replacement of the unsupported instruction by two or more corresponding instructions of the set of instructions.

Due to the dynamic nature of the present extension of supported instructions, in various examples, there is no need to locally keep a repository of possible extensions to be applied to the processor. Instead, the corresponding updated may be obtained, e.g., requested and downloaded (e.g., from a server of the processor manufacturer), as needed. For example, the processing circuitry may be configured to download an update with support for the targeted unsupported instruction at the processor, with the instructions supported by the processor being extended based on the downloaded update. Accordingly, as further shown in FIG. 1*b*, the method may optionally comprise downloading 140 an update with support for the targeted unsupported instruction at the processor, with the instructions supported by the processor being extended based on the downloaded update. For example, the update may be downloaded after (e.g., in response to) determining the unsupported instruction. In particular, the update may be downloaded based on the identified unsupported instruction.

To avoid compromising the security of the processor, some measures may be taken to avoid unauthorized modifications of the processor. For example, the processing circuitry may be configured to obtain the update with a secure authentication information, with the extending the instructions supported by the processor being performed after secure authentication towards the processor. Accordingly, as further shown in FIG. 1*b*, the method may optionally comprise obtaining 140 the update with a secure authentication information, with the extending the instructions supported by the processor being performed after secure authentication 150 towards the processor. In particular, the processing circuitry may be configured to authenticate the update towards the processor based on cryptographic information (such as a cryptographic signature) contained in the secure authentication information. Accordingly, as further shown in FIG. 1*b*, the method may optionally comprise authenticating 150 the update towards the processor based on cryptographic information contained in the secure authentication information. For example, the update may be cryptographically signed, so that the update is only accepted by the processor if the processor can verify the authenticity of the update. For example, the update may be signed by a special signing key of the processor manufacturer (with the processor verifying the signature using a corresponding public key of the processor manufacturer). In addition, e.g., if the processor is used by a large customer of the processor manufacturer, the update may further be signed by a customer-specific signing key of the customer (with the processor verifying the signature using a corresponding customer-specific signing key). Alternatively, a chain-of-trust-based system may be used, where the customer-specific signature can be verified against a customer-specific public key, with the customer-specific public key being verified as authorized based on a chain-of-trust terminating at a root key of the processor manufacturer.

Once the instructions supported by the processor are extended, they may be used to execute the computer program. In other words, the processing circuitry is configured to execute the computer program, e.g., using the at least one added instruction to handle the instructions (previously) unsupported by the processor.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 100 may be a workstation computer system (e.g., a workstation computer system being used for scientific computation) or a server computer system, i.e., a computer system being used to serve functionality, such as the computer program, to one or client computers.

More details and aspects of the apparatus 10, device 10, method, computer program and computer system 100 are mentioned in connection with the proposed concept, or one or more examples described above or below (e.g., FIG. 2). The apparatus 10, device 10, method, computer program and computer system 100 may comprise one or more additional optional features corresponding to one or more aspects of the proposed concept, or one or more examples described above or below.

Various examples of the present disclosure relate to a concept for a microarchitectural flow of a microcode-based decode for synthetic ISA.

Some examples of the present disclosure address the support of Web Assembly intermediate representation (IR) on a legacy instruction set architecture (ISA). The proposed concept may bridge the tension between maintaining ISA compatibility and stability and reacting to emergent IR trends (such as LLVM bitcode IR, WASM IR, etc.).

The proposed concept may address this tension by providing downloadable custom microcode. This may include the ability to trap on executing these IR's and directly executing as non-standard micro-operations (uops). Today, complex ISAs, such as Intel's ISA, typically have a macroinstruction (e.g., AVX2 Add) to a uop (fp_double_add). For the proposed concept, a broader array of uops exposing the various capabilities of the MEU (Management Unit (Memory Execution Unit), ALU (Arithmetic Logic Unit), on-die XPU, etc. may be used. This latter pool of uops is in the following also denoted fine_grain_uops. In this model, WASM_IR_OPCODE can map to corresponding fine_grain_uop via a XuCodeIRopcodeDispatcher (shown in connection with FIG. 2) or a new microcode direct flow. Various examples of the proposed concept are thus based on having custom ALU uops that can map to other ISA. A custom ISA instruction for JIT dispatching may be provided. Various examples may also provide a concept for sending ISA opcode to an XPU. Various examples may also provide a concept for downloadable decoders for different ISA or IR ISA to uops/XPU flows.

The proposed concept may also be used with respect to other ISA's, such as RISC-V or ARM as the external ISA, enabling modeling the other ISA as just another IR. This may avoid overhead of binary translators.

The proposed downloadable XuCodeIRopcodeDispatcher and associated mapper code may provide immense benefit to users of the respective processors. However, care may be taken that this facility does not become an attack vector for privilege escalation. To that end, a special signing key and manifest may be used for these XuCodeIRopcodeDispatcher patches that are at least signed against the global key for the CPU family and can be extended to be also signed against a fuse key for customers, either one-time programmable or managed by the Essential Security Engine (ESE) in client/Server Startup Security Module (S3M) on servers, so that this capability can be activated, deactivated and/or licensed as part of a broader service based (e.g., Software as a Service) offering.

The proposed concept may provide synthetic ISA support at an improved performance with a short Time to Market (TTM), providing additional benefits for existing processors/sockets. Moreover, it may be used to evaluate new synthetic ISA adoption in the market before having a hardwired metal feature. The proposed concept may be scaled up to leverage a programmable microcontroller like S3M or a minuscule FPGA for custom acceleration.

Various examples of the proposed concept may provide a concept for a microcode-based decode for synthetic ISA. One or more of the following components may be used to implement the concept.

A first component is a Managed Run Time (MRT) smart code generator, which may implement an aspect of the apparatus 10 or device 10 introduced in connection with FIG. 1*a*. In many cases, the ISA of a CISC-based processors, such as Intel® processors, have a fixed mapping between a macroinstruction (e.g., AVX2 Add) to a uop (fp_double_add). In the proposed concept, a broader array of uops exposing the various capabilities of the MEU, ALU, on-die XPU, etc. may be used. This latter pool of uops is in the following also denoted fine_grain_uops. In this model, WASM_IR_OPCODE can map to a corresponding fine_grain_uop via the XuCodeIRopcodeDispatcher or a new microcode direct flow. For example, based on real-time telemetry of the uOps execution from Intel® Thread Director Technology (TDT), kernels may be dynamically adapted and re-JITed (Just-in-Time compilation may be repeated based on the adaptation). Thread(s) pool(s) may be scheduled to appropriate newer uOps by downloading custom microcode (XuCodeIRopcodeDispatcher modules).

A second component is an MRT Smart Scheduler, which may implement an aspect of the apparatus 10 or device 10 introduced in connection with FIG. 1*a*. For example, based on realtime telemetry of the uOps execution from Intel's TDT, the MRT Smart Scheduler may dynamically adapt and schedule re-JITed thread (s) pool (s) to appropriate E (Efficiency) vs. P (Performance) Cores.

A third component is the aforementioned XuCodeIRopcodeDispatcher. The downloadable XuCodeIRopcodeDispatcher, which may implement an aspect of the apparatus 10 or device introduced in connection with FIG. 1*a*, may map the WASM_IR_OPCODE generated by MRT Smart Code Generator to fine_grain_uops or change an existing uop flow. This XuCodeIRopcodeDispatcher, and the associated mapper code, may represent a post-ship facility to extend the functionality of existing processors. As outlined above, with respect to this feature, care may be taken with respect to security, such that this facility doesn't become an attack vector for privilege escalation. To that end, a special signing key and manifest may be used for these XuCodeIRopcodeDispatcher patches that are at least signed against the global key for the CPU family. In an extension, they can also be signed against a fuse key for users of the processor, either one-time programmable or managed by the Essential Security Engine (ESE) in client/Server Startup Security Module (S3M) on servers, so that this capability can be activated, deactivated and/or licensed as part of a broader service based (e.g., Software as a Service) offering.

In other systems, a WASM IR is obtained (1), the IR is JIT-compiled to existing x86 macrocodes (2) and the JIT-ed code is run (3), which eventually executes as legacy microoperations. In the proposed flow, a XuCodeIRopcodeDispatcher patch version is loaded for the respective WASM (1). The WASM may be directly executed (2). The respective instructions of the WAM IR may trap into the XuCodeIRopcodeDispatcher (3, as shown in FIG. 2), and the respective fine_grain_uops may be executed.

FIG. 2 shows a schematic illustration of ISA emulation by replacing marker stubs with native microoperations. As shown in Fig., x86 instructions 210; 215 are executed using the corresponding microoperations 220; 225. A computer program comprising WASM IR 230 is JIT-compiled by a WASM runtime 240. Instructions generated by the runtime 240 may be trapped by XuCodeIRopcodeDispatcher 250, which may support the fine_grain_uops. The XuCodeIRopcodeDispatcher 250 may perform these instructions by generating uOp(s) 260 of a preamble and for XuCode invocation, uOp(s) 280 that are based on XuCode instructions 270 for supporting the fine_grain_uops, and uOp(s) 290 of a post-amble and for x86 resumption. After executing such a fine_grain_uop, the processor may return to executing x86 instructions 215, which are mapped to corresponding uOp(s) 225.

Various examples of the present disclosure may also provide workload migration among P & E Cores. The proposed concept may be applied for workload migration among similar, but not identical Big.little heterogeneous systems such as Intel's P&E cores. The proposed concept may provide the capability to support VM migration into a newer architecture and gracefully handling incompatible ISAs via XuCode Emulation, Recovery and Re-JIT using the MRT Smart Code Generator and Scheduler to match newer architecture along with application QoS requirements.

In some examples, the proposed concept may be used to emulate other ISAs, such as the ARM ISA, RISC-V ISA, or Power Personal Computer (PPC) ISA by loading a corresponding XuCodeIRopcodeDispatcher patch version. For example, this may be used to execute an ARM (or RISC-V or PPC) Android binary on an x86 Chromebook. For example, the respective ARM/RISC-V/PPC may be run with traps to XuCodeIRopcodeDispatcher and executed via fine_grain_uops.

Instead of the aforementioned fine_grain_uops mentioned in the present disclosure, another option is to update the XuISA (which today is really just ring0 x86 ISA) with customer macrooperations/macroinstructions only available while running XuCode.

The proposed concept may allow processors manufacturers to keep code-generation proprietary, enabling differentiation versus other processors manufacturers using the same (x86) ISA. It may allow for JIT compilation to the XPU ISA. The proposed capability may be licensed as a hardware block or service, supporting different ISA (such as RISC-V, ARM, X86).

In general, "officially" adding an instruction to a macroISA (e.g., to the "official" ISA of the processor) takes effort to enable, validate, support the instruction forever (as processor manufacturers are often reluctant to drop instructions). The proposed microISA (e.g., the instructions added to the instructions supported by the processor) may be used and supported among few parties and may be evolved or deprecate as needed. The proposed microISA may also be put into a FPGA, so that the microISA can have an FPGA based flow, too. This may result in a private microISA and private/reprogrammable hardware flow behind the microISA.

In the following, some examples of the proposed concept are presented:

An example (e.g., example 1) relates to an apparatus (10) for extending the instructions supported by a processor (105), the apparatus comprising interface circuitry (12) and processing circuitry (14) configured to identify at least a part of a computer program targeting an instruction unsupported by a pre-defined set of instructions of an Instruction Set Architecture (ISA) of the processor. The machine-readable instructions comprise instructions to extend the instructions supported by the processor, based on the targeted unsupported instruction, and execute the computer program.

Another example (e.g., example 2) relates to a previously described example (e.g., example 1) or to any of the examples described herein, further comprising that extending the instructions supported by the processor comprises applying an update with support for the targeted unsupported instruction at the processor.

Another example (e.g., example 3) relates to a previously described example (e.g., one of the examples 1 to 2) or to any of the examples described herein, further comprising that extending the instructions supported by the processor comprises applying a microcode update with support for the targeted unsupported instruction at the processor.

Another example (e.g., example 4) relates to a previously described example (e.g., one of the examples 1 to 3) or to any of the examples described herein, further comprising that the processing circuitry is configured to download an update with support for the targeted unsupported instruction at the processor, with the instructions supported by the processor being extended based on the downloaded update.

Another example (e.g., example 5) relates to a previously described example (e.g., example 2) or to any of the examples described herein, further comprising that the processing circuitry is configured to obtain the update with a secure authentication information, wherein extending the instructions supported by the processor is performed after secure authentication towards the processor.

Another example (e.g., example 6) relates to a previously described example (e.g., example 5) or to any of the examples described herein, further comprising that the processing circuitry is configured to authenticate the update towards the processor based on cryptographic information contained in the secure authentication information.

Another example (e.g., example 7) relates to a previously described example (e.g., one of the examples 1 to 6) or to any of the examples described herein, further comprising that extending the instructions supported by the processor is performed at runtime in preparation of the execution of the computer program.

Another example (e.g., example 8) relates to a previously described example (e.g., one of the examples 1 to 7) or to any of the examples described herein, further comprising that extending the instructions supported by the processor is performed if the instructions supported by the processor do not allow for an optimized execution of the computer program.

Another example (e.g., example 9) relates to a previously described example (e.g., one of the examples 1 to 8) or to any of the examples described herein, further comprising that extending the instructions supported by the processor is performed if execution of part of the computer program targeting an instruction unsupported by the set of instructions requires emulation or replacement of the instruction by two or more corresponding instructions of the set of instructions.

Another example (e.g., example 10) relates to a previously described example (e.g., one of the examples 1 to 9) or to any of the examples described herein, further comprising that extending the instructions supported by the processor adds at least one microinstruction or macroinstruction to the instructions supported by the processor.

Another example (e.g., example 11) relates to a previously described example (e.g., example 10) or to any of the examples described herein, further comprising that the added at least one microinstruction or macroinstruction is not publicly exposed as part of the instructions supported by the processor.

Another example (e.g., example 12) relates to a previously described example (e.g., one of the examples 1 to 11) or to any of the examples described herein, further comprising that the computer program targeting an instruction unsupported by the set of instructions is an emulator for emulating a second ISA being different from the ISA of the processor.

Another example (e.g., example 13) relates to a previously described example (e.g., one of the examples 1 to 12) or to any of the examples described herein, further comprising that the instruction unsupported by the set of instructions is an instruction of a second ISA being different from the ISA of the processor.

Another example (e.g., example 14) relates to a previously described example (e.g., example 0) or to any of the examples described herein, further comprising that the computer program is based on a bytecode or an intermediate representation (IR).

Another example (e.g., example 15) relates to a previously described example (e.g., one of the examples 1 to 14) or to any of the examples described herein, further comprising that the processing circuitry is configured to process the computer program to identify the at least part of the computer program targeting an instruction unsupported by the set of instructions.

Another example (e.g., example 16) relates to a previously described example (e.g., one of the examples 1 to 15) or to any of the examples described herein, further comprising that the processing circuitry is configured to monitor the execution of the program to identify at least a part of the computer program targeting an instruction unsupported by the set of instructions.

Another example (e.g., example 17) relates to a previously described example (e.g., one of the examples 1 to 16) or to any of the examples described herein, further comprising that the processing circuitry is configured to execute a runtime or emulator, with the runtime or emulator performing the identification of the at least part of the computer program, the extending of the instructions supported by the processor and the execution of the computer program Another example (e.g., example 18) relates to a previously described example (e.g., one of the examples 1 to 17) or to any of the examples described herein, further comprising that the ISA is of the processor is a Complex Instruction Set Computer (CISC)-based ISA.

Another example (e.g., example 19) relates to a previously described example (e.g., one of the examples 1 to 18) or to any of the examples described herein, further comprising that the instruction unsupported by the set of instructions is a Reduced Instruction Set Computer (RISC)-based instruction.

Another example (e.g., example 20) relates to a previously described example (e.g., example 19) or to any of the examples described herein, further comprising that the instruction unsupported by the set of instructions is Reduced Instruction Set Computer Five (RISC-V) based or ARM-based.

Another example (e.g., example 21) relates to a previously described example (e.g., one of the examples 1 to 20) or to any of the examples described herein, further comprising that the processor is a Central Processing Unit (CPU).

Another example (e.g., example 22) relates to a previously described example (e.g., one of the examples 1 to 21) or to any of the examples described herein, further comprising that the processor is an XPU.

Another example (e.g., example 23) relates to a previously described example (e.g., example 22) or to any of the examples described herein, further comprising that the XPU is one of a Central Processing Unit (CPU), Graphics Processing Unit (GPU), an Artificial Intelligence (AI) accelerator, an accelerator card and offloading circuitry.

An example (e.g., example 24) relates to a computer system (100) comprising the apparatus (10) according to one of the examples 1 to 23 or according to any other example and the processor (105).

An example (e.g., example 25) relates to an apparatus (10) for extending the instructions supported by a processor (105), the apparatus comprising interface circuitry (12), machine-readable instructions and processing circuitry (14) to execute the machine-readable instructions to identify at least a part of a computer program targeting an instruction unsupported by a predefined set of instructions of an Instruction Set Architecture (ISA) of the processor. The processing circuitry is configured to extend the instructions supported by the processor, based on the targeted unsupported instruction, and execute the computer program.

An example (e.g., example 26) relates to a computer system (100) comprising the apparatus (10) according to example 25 or according to any other example and the processor (105).

An example (e.g., example 27) relates to a device (10) for extending the instructions supported by a processor (105), the device comprising means for processing (14) configured to identify at least a part of a computer program targeting an instruction unsupported by a pre-defined set of instructions of an Instruction Set Architecture (ISA) of the processor. The means for processing 14 is configured to extend the instructions supported by the processor, based on the targeted unsupported instruction, and execute the computer program.

An example (e.g., example 28) relates to a computer system (100) comprising the device (10) according to example 27 or according to any other example and the processor (105).

An example (e.g., example 29) relates to a method for extending the instructions supported by a processor (105), the method comprising identifying (110) at least a part of a computer program targeting an instruction unsupported by a pre-defined set of instructions of an Instruction Set Architecture (ISA) of the processor, extending (160) the instructions supported by the processor, based on the targeted unsupported instruction, and executing (170) the computer program.

Another example (e.g., example 30) relates to a previously described example (e.g., example 29) or to any of the examples described herein, further comprising that extending the instructions supported by the processor comprises applying an update with support for the targeted unsupported instruction at the processor.

Another example (e.g., example 31) relates to a previously described example (e.g., one of the examples 29 to 30) or to any of the examples described herein, further comprising that extending the instructions supported by the processor comprises applying a microcode update with support for the targeted unsupported instruction at the processor.

Another example (e.g., example 32) relates to a previously described example (e.g., one of the examples 29 to 31) or to any of the examples described herein, further comprising that the method comprises downloading (140) an update with support for the targeted unsupported instruction at the processor, with the instructions supported by the processor being extended based on the downloaded update.

Another example (e.g., example 33) relates to a previously described example (e.g., example 30) or to any of the examples described herein, further comprising that the method comprises obtaining (140) the update with a secure authentication information, wherein extending the instructions supported by the processor is performed after secure authentication (150) towards the processor.

Another example (e.g., example 34) relates to a previously described example (e.g., example 33) or to any of the examples described herein, further comprising that the method comprises authenticating (150) the update towards the processor based on cryptographic information contained in the secure authentication information.

Another example (e.g., example 35) relates to a previously described example (e.g., one of the examples 29 to 34) or to any of the examples described herein, further comprising that the method comprises processing (120) the computer program to identify (110) the at least part of the computer program targeting an instruction unsupported by the set of instructions.

Another example (e.g., example 36) relates to a previously described example (e.g., one of the examples 29 to 35) or to any of the examples described herein, further comprising that the method comprises monitoring (130) the execution of the program to identify at least a part of the computer program targeting an instruction unsupported by the set of instructions.

An example (e.g., example 37) relates to a computer system (100) being configured to perform the method (10) according to one of the examples 29 to 36 or according to any other example, the computer system comprising the processor (105).

An example (e.g., example 38) relates to a non-transitory machine-readable storage medium including program code, when executed, to cause a machine to perform the method of one of the examples 29 to 36 or according to any other example.

An example (e.g., example 39) relates to a computer program having a program code for performing the method of one of the examples the method of one of the examples 29 to 36 or according to any other example when the computer program is executed on a computer, a processor, or a programmable hardware component.

An example (e.g., example 40) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term “module” refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term “circuitry” can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for extending the instructions supported by a processor, the apparatus comprising interface circuitry and processing circuitry configured to:

identify at least a part of a computer program targeting an instruction unsupported by a pre-defined set of instructions of an Instruction Set Architecture (ISA) of the processor, extend the instructions supported by the processor, based on the targeted unsupported instruction, and execute the computer program, wherein the processing circuitry is configured to download an update with support for the targeted unsupported instruction at the processor, with the instructions supported by the processor being extended based on the downloaded update.

2. The apparatus of claim 1, wherein extending the instructions supported by the processor comprises applying an update with support for the targeted unsupported instruction at the processor.

3. The apparatus of claim 1, wherein extending the instructions supported by the processor comprises applying a microcode update with support for the targeted unsupported instruction at the processor.

4. The apparatus of claim 2, wherein the processing circuitry is configured to obtain the update with a secure authentication information, wherein extending the instructions supported by the processor is performed after secure authentication towards the processor.

5. The apparatus of claim 4, wherein the processing circuitry is configured to authenticate the update towards the processor based on cryptographic information contained in the secure authentication information.

6. The apparatus of claim 1, wherein extending the instructions supported by the processor is performed at runtime in preparation of the execution of the computer program.

7. The apparatus of claim 1, wherein extending the instructions supported by the processor is performed if the instructions supported by the processor do not allow for an optimized execution of the computer program.

8. The apparatus of claim 1, wherein extending the instructions supported by the processor is performed if execution of part of the computer program targeting an instruction unsupported by the set of instructions requires emulation or replacement of the instruction by two or more corresponding instructions of the set of instructions.

9. The apparatus of claim 1, wherein extending the instructions supported by the processor adds at least one microinstruction or macroinstruction to the instructions supported by the processor.

10. The apparatus of claim 9, wherein the added at least one microinstruction or macroinstruction is not publicly exposed as part of the instructions supported by the processor.

11. The apparatus of claim 1, wherein the computer program targeting an instruction unsupported by the set of instructions is an emulator for emulating a second ISA being different from the ISA of the processor.

12. The apparatus of claim 1, wherein the instruction unsupported by the set of instructions is an instruction of a second ISA being different from the ISA of the processor.

13. The apparatus of claim 1, wherein the computer program is based on a bytecode or an intermediate representation (IR).

14. The apparatus of claim 1, wherein the processing circuitry is configured to process the computer program to identify the at least part of the computer program targeting an instruction unsupported by the set of instructions.

15. The apparatus of claim 1, wherein the processing circuitry is configured to monitor the execution of the program to identify at least a part of the computer program targeting an instruction unsupported by the set of instructions.

16. The apparatus of claim 1, wherein the processing circuitry is configured to execute a runtime or emulator, with the runtime or emulator performing the identification of the at least part of the computer program, the extending of the instructions supported by the processor and the execution of the computer program.

17. The apparatus of claim 1, wherein the ISA is of the processor is a Complex Instruction Set Computer (CISC)-based ISA.

18. The apparatus of claim 1, wherein the instruction unsupported by the set of instructions is a Reduced Instruction Set Computer (RISC)-based instruction.

19. The apparatus of claim 18, wherein the instruction unsupported by the set of instructions is Reduced Instruction Set Computer Five (RISC-V) based or ARM-based.

20. The apparatus according to claim 1, wherein the processor is a Central Processing Unit (CPU).

21. The apparatus according to claim 1, wherein the processor is an XPU.

22. The apparatus according to claim 21, wherein the XPU is one of a Central Processing Unit (CPU), Graphics Processing Unit (GPU), an Artificial Intelligence (AI) accelerator, an accelerator card and offloading circuitry.

23. A method for extending the instructions supported by a processor, the method comprising:

identifying at least a part of a computer program targeting an instruction unsupported by a pre-defined set of instructions of an Instruction Set Architecture (ISA) of the processor, extending the instructions supported by the processor, based on the targeted unsupported instruction, and executing the computer program, wherein an update with support for the targeted unsupported instruction at the processor is downloaded and the instructions supported by the processor are extended based on the downloaded update.

24. A non-transitory machine-readable storage medium including program code, when executed, to cause a machine to perform the method of claim 23.

* * * * *